US008388015B2

(12) United States Patent
Chen

(10) Patent No.: US 8,388,015 B2
(45) Date of Patent: Mar. 5, 2013

(54) FOLDING WAGON WITH SEATS

(75) Inventor: Zhaosheng Chen, El Monte, CA (US)

(73) Assignee: Bam Brokerage, Inc., Lake Forest, CA (US)

( * ) Notice: Subject to any disclaimer, the term of this patent is extended or adjusted under 35 U.S.C. 154(b) by 365 days.

(21) Appl. No.: 12/715,623

(22) Filed: Mar. 2, 2010

(65) Prior Publication Data

US 2010/0156069 A1    Jun. 24, 2010

Related U.S. Application Data

(63) Continuation-in-part of application No. 12/287,579, filed on Oct. 10, 2008, now Pat. No. 8,011,686.

(51) Int. Cl.
B62B 7/06    (2006.01)

(52) U.S. Cl. .................. 280/647; 280/642; 280/657

(58) Field of Classification Search .............. 280/642, 280/647, 650, 657, 658
See application file for complete search history.

(56) References Cited

U.S. PATENT DOCUMENTS

| 4,706,986 | A | * | 11/1987 | Kassai | 280/642 |
|---|---|---|---|---|---|
| 4,741,552 | A | * | 5/1988 | Kassai | 280/647 |
| 4,746,140 | A | * | 5/1988 | Kassai | 280/642 |
| 4,834,415 | A | * | 5/1989 | Yee | 280/644 |
| 4,886,289 | A | * | 12/1989 | Yee et al. | 280/643 |
| 5,050,900 | A | * | 9/1991 | Lee | 280/642 |
| D344,916 | S | * | 3/1994 | McGuire et al. | D12/129 |
| 5,333,893 | A | * | 8/1994 | Chen | 280/642 |
| D378,997 | S | * | 4/1997 | Marozza et al. | D12/129 |
| D394,831 | S | * | 6/1998 | Polak et al. | D12/129 |
| 5,769,448 | A | * | 6/1998 | Wang | 280/642 |
| 5,911,432 | A | * | 6/1999 | Song | 280/643 |
| 5,957,482 | A | * | 9/1999 | Shorter | 280/639 |
| 6,260,566 | B1 | * | 7/2001 | LaFave et al. | 135/88.01 |
| 6,318,740 | B1 | * | 11/2001 | Nappo | 280/87.01 |
| 6,446,981 | B1 | * | 9/2002 | Wise et al. | 280/7.17 |
| 6,845,991 | B1 | * | 1/2005 | Ritucci et al. | 280/30 |
| 6,932,365 | B2 | * | 8/2005 | Chiappetta et al. | 280/47.371 |
| 7,487,977 | B2 | * | 2/2009 | Johnson | 280/47.34 |
| D634,245 | S | * | 3/2011 | Liao | D12/129 |
| 8,191,907 | B2 | * | 6/2012 | Watson | 280/30 |
| 2003/0025301 | A1 | * | 2/2003 | Banuelos, III | 280/651 |
| 2010/0090444 | A1 | * | 4/2010 | Chen et al. | 280/651 |
| 2010/0156069 | A1 | * | 6/2010 | Chen | 280/639 |

* cited by examiner

Primary Examiner — Jeffrey J Restifo
(74) Attorney, Agent, or Firm — Charles C. H. Wu; Wu & Cheung, LLP

(57) ABSTRACT

A folding wagon has a folding frame with a stowed and open position. The folding frame has a pair of front vertical supports, and a pair of rear vertical supports. A lower front horizontal support connects between the pair of front vertical supports, and a lower rear horizontal support connects between the pair of rear vertical supports. An upper front horizontal support connects between the pair of front vertical supports, and an upper rear horizontal support connects between the pair of rear vertical supports. The folding frame has supplemental links that form a frame for seats including a front seat bar extending between a pair of front seat vertical members and including a rear seat bar extending between a pair of rear seat vertical members. Sidewall members have a pair of horizontal supports pivotally connected to the front vertical supports and the rear vertical supports.

18 Claims, 6 Drawing Sheets

FOLDING WAGON WITH SEATS

This application is a continuation in part of co-pending United States patent application for inventor Chen, Zhaosheng Ser. No. 12/287,579 Folding Wagon filed Oct. 10, 2008 now U.S. Pat. No. 8,011,686, the disclosure of which is incorporated herein by reference.

DISCUSSION OF RELATED ART

The pull wagon has been used for transporting groceries, small children, gardening supplies and the like for many centuries. Typically, the wagon has a wagon bed with a handle and four wheels. The wagon is multi-functional, pedestrian and generally a neighborhood vehicle. Taking the wagon on camping trips, to the beach or anywhere would generally require loading it into an automobile. Because the traditional pull wagon is not collapsible, the space limitations in a car may sometimes make the transportation of the wagon cumbersome and difficult.

As an improvement to the traditional pull wagon, a variety of folding versions have been invented. For example, a folding child wagon as described in U.S. Pat. No. 5,957,482 filed Aug. 30, 1996 to Mr. Shorter (the disclosure of which is incorporated herein by reference) provides a wagon with a transversely divided in hinged for folding from a flat position for use to a position which the two bed halves are in face-to-face contact for storage. Furthermore, the removable rail modules may be removable for storage.

Some wagons are capable of folding into a small compact area. For example, Ritucci shows in U.S. Pat. No. 6,845,991, filed Mar. 17, 2003 a folding wagon that has folding wheels which can be folded for storage such that the entire package appears to fold into a briefcase like module.

Other inventions such as Banuelos' folding wagon of application Ser. No. 09/732,556, publication number 2003/0025301 having a filing date of Dec. 8, 2000 (the disclosure of which is incorporated herein by reference) provides a net for storing cargo with the net capable of extending between the bottom panel assembly and the upper rail for forming a cargo compartment. A worldwide need for folding wagons has provided a panoply of possibilities. Numerous designs having folding wheels, folding beds, and folding frames have been developed.

In addition to the basic traditional pull wagon, there have been wagons for holding children.

SUMMARY OF THE INVENTION

A folding wagon has a folding frame with a stowed position and an open position. The folding frame comprises a pair of front and rear vertical support, a front upper horizontal support extending between the pair of front vertical supports, a rear horizontal support extending between the pair of rear vertical supports, and a pair of lower horizontal support. The folding frame further comprises a pair of front supplemental links and a pair of rear supplemental links. The pair of front supplemental links are pivotally connected to diagonal folding members, and the pair of rear supplemental links are pivotally connected to diagonal folding members. The pair of front supplemental links are pivotally connected to the pair of front vertical support and the pair of rear supplemental links are pivotally connected to the pair of rear vertical supports. A plurality of flatbed supports form a central flatbed support joint in the middle of the wagon. The central flatbed support joint folds upward when the folding frame is being configured into stowed position, and the plurality of flatbed supports are pivotally connected to the pair of front vertical supports and the pair of rear vertical supports. Wheels attach to the folding frame.

For cover, four telescopic bushing can be mounted on the pair of front vertical support and on the pair of rear vertical support. The pair of front vertical support and the pair of rear vertical support are substantially hollow. Four telescopic extensions can be mounted in telescopic configuration on the telescopic bushing. Four telescopic bulbs can be mounted at a telescopic extension upper end. The telescopic extensions have a retracted position, retracting inside a hollow formed within the vertical support, and the telescopic extensions have an extended position protruding above the vertical support. A fabric canopy may have a top panel, and four sidewalls forming four corners. Each of the four corners receives one of the four telescopic bulbs. The four telescopic extensions flex toward the middle of the wagon for imparting a lodging force of the telescopic bulbs in each of the four corners. The telescopic bushings retard retraction when the telescopic extensions are flexed. Retraction is retarded by friction binding of the telescopic extensions against the bushing, and possibly also against the inside of the vertical hollow.

The folding wagon also has a plurality of flatbed supports. A plurality of lengthwise flatbed supports and a plurality of widthwise flatbed supports can support articles within the wagon bed. Preferably, there are eight lengthwise flatbed supports and four widthwise flatbed supports. The fabric canopy preferably has a trapezoidal side profile, but could also be rectangular shaped. Decorative trim can be used around the edge of the fabric canopy, and around the edge of the bag, and around the edge of the fabric bed. A handle assembly can be connected to the front of the wagon for manual control.

A fabric bag is mounted to the bag frame. The bag frame forms a rim for the fabric bag. The bag frame folds along with the wagon when the wagon is folded. The bag frame drops down when folded. The bag frame is connected to the folding frame. In the best mode of the folding frame, the folding frame comprises a number of diagonal supports that form a pair of X shaped members on each of the left and right side walls of the wagon when the wagon is in deployed position. The four bar mechanism of the diagonal supports maintains the diagonal supports in parallel to some of the other diagonal supports.

Generally speaking, the second embodiment of the present invention describes the same a folding wagon has a folding frame with a stowed and open position. The folding frame has a pair of front vertical supports, and a pair of rear vertical supports. A lower front horizontal support connects between the pair of front vertical supports, and a lower rear horizontal support connects between the pair of rear vertical supports. An upper front horizontal support connects between the pair of front vertical supports, and an upper rear horizontal support connects between the pair of rear vertical supports. The folding frame has supplemental links that form a frame for seats including a front seat bar extending between a pair of front seat vertical members and including a rear seat bar extending between a pair of rear seat vertical members. Sidewall members have a pair of horizontal supports pivotally connected to the front vertical supports and the rear vertical supports.

The pair of horizontal supports includes a right horizontal support and a left horizontal support, and the pair of horizontal supports of the sidewall members has a pair of horizontal folding members pivotally connected to a pair of central vertical members. The right horizontal support is formed as a pair of segments, namely a front right horizontal support segment and a rear right horizontal support segment, and the left horizontal support is formed as a pair of segments, namely a front left horizontal support segment and a rear left horizontal support segment. The pair of horizontal supports is pivotally connected at a pair of double joint angle connectors.

The frame supports pair of seats, and the pair of seats comprises a front seat mounted to the front seat bar and a rear seat mounted to a rear seat bar. A foot rest is pivotally mounted to the pair of front seat vertical members and pivotally mounted to the pair of rear seat vertical members, and at least a portion of the foot rest is positioned between the pair of front seat vertical members and the pair of rear seat vertical members. The front seat vertical members and the rear seat vertical members are positioned between the front vertical members and the rear vertical members. After that, wheels are attached to the folding frame in a conventional manner.

More specifically, the second embodiment of the present invention includes a folding wagon with a pair of bench seats, namely a front seat and a rear seat. The folding wagon with seats can be constructed with the same general outside frame as the folding wagon without seats. The folding wagon with seats has many common characteristics shared with the other embodiment, such as a handle assembly, handle yoke, handle stem and handle grip. There is preferably one handle assembly, one handle yoke, a single handle stem, and a single handle grip. The second handle joint of the first embodiment is preferably not included in the second embodiment such that the handle directly connects to the frame of the wagon via the first handle joint. Optionally, the handle clip can be screw mounted to the front upper horizontal support. Preferably, there is a single handle clip.

The folding wagon and with seats has a folded configuration and a deployed configuration. When the folding wagon with seats is folded, a frame clip retains the rear upper horizontal support to the front upper horizontal support. Preferably, there is a single rear upper horizontal support, although there could be more. The frame clip also includes a frame clip body that is preferably elongated and terminates in a frame clip slot. The frame clip slot is engaged with the front upper horizontal support when the folding wagon is in a folded configuration. A protrusion such as a tab on the back of the frame clip slot provides a finger grip for biasing the frame clip slot off of the front upper horizontal support when a user desires to transform the folding wagon from deployed configuration to the folded configuration. The frame clip is mounted in an offset position so that it does not interact with the handle clip. The length of the frame clip is approximately the width of the apparatus in folded configuration. Preferably, there is a single frame clip, although there could be a pair or more.

The frame of the wagon is constructed in a folding manner including an angle connector that connects a preferably hollow square cross-section vertical stanchion to a horizontal round cross-section tube. Preferably, there are four angle connectors. The angle connector connects the front upper horizontal support to the front vertical support. Preferably, there is a single front upper horizontal support, although there could be more and preferably includes a pair of front vertical supports. The front vertical support is preferably welded to the front lower horizontal support. In a similar manner, the angle connector is used for connecting the rear upper horizontal support to the rear vertical support. Preferably, there are a pair of rear vertical supports so that there are a total of four vertical supports at each of the four corners of the wagon above each of the four wheels of the wagon. Additionally, the pair of rear vertical support are preferably connected to the rear lower horizontal support by welding. Preferably, there is a single rear lower horizontal support. The angle connector may have a pair of screw openings that are threaded or unthreaded for allowing a screw to pass through the opening of the angle connector and engage and retain the support member inserted into a socket of the angle connector. The angle connector can also be made as a bending of a member such that the integral one piece construction can be a substitute.

A bag frame is similarly pivotally attached to the frame of the wagon at upper pivot joints, and continuations from the bag frame extend to joint angle connectors. The continuations form arm rest members that have a first arm rest cushion in the rear seat and a second arm rest cushion in the front seat. In the rear seat, the joint angle connector connects the rear seat vertical member to the arm rest member in a pivotal fashion. For the front seat, the joint angle connector connects the armrest member to the front seat vertical member at in a similar fashion as in the rear seat. Preferably, there are a total of four armrests, one in the front right of the wagon, one in the front left of the wagon, one in the rear left of the wagon and one in the rear right of the wagon such that there are a pair of armrests in the front seat and a pair of armrests in rear seat, and also such that there are a pair of armrests on the right side of the wagon and a pair of armrests on the left side of the wagon.

A number of horizontal folding members form a pair of sidewalls for retaining the children within the folding wagon. The wagon frame preferably has a pair of second horizontal folding members and a pair of first horizontal folding members. The wagon frame preferably has a left second horizontal folding member a right second horizontal folding member. Each horizontal folding member can be formed in a pair of sections such that there are a total of eight sections, namely: a right front seat first horizontal member folding section, a left front seat first horizontal member folding section, a right front seat second horizontal member folding section, a left front seat second horizontal member folding section; and a right rear seat first horizontal member folding section, a left rear seat first horizontal member folding section, a right rear seat second horizontal member folding section, a left rear seat second horizontal member folding section.

The second horizontal folding member and the first horizontal folding member are mechanically connected via linkages. The wagon frame preferably has a right first horizontal folding member and a left first horizontal folding member. The first horizontal folding member is below and parallel to the second horizontal folding member, which is in turn below the armrest member. The second horizontal folding member is pivotally attached at its pair of ends to the middle pivot joint. The first horizontal folding member is pivotally attached at its pair of ends to the lower pivot joint. The lower pivot joint corresponds to the lower pivot joint of the first embodiment.

The lower pivot joint is attached by a pin or round joint member on a cap fitted to the first horizontal folding member. The cap is placed flush against the flat portion of the rear vertical support. A bracket welded to the vertical support can connect between the cap and the vertical support.

A central upper joint preferably forms a double joint angle connector which bisects at a midpoint of the second horizontal folding member. The central middle joint similarly bisects the middle part of the first horizontal folding member. The first horizontal folding member is therefore preferably formed as a pair of hollow steel members having a front and rear section. The central middle joint connects the first horizontal folding member to the central vertical member. The central upper joint connects the second horizontal folding member to the central vertical member and an upper end. The lower portion of the central vertical member is connected to a central lower joint.

A slide joint fits as a sleeve over the second horizontal folding member to allow sliding relative to the second horizontal folding member. A total of four slide joints fit over a total of four sections of the second horizontal folding member.

In the front seat, a seat bar is horizontally connected between a pair of front seat vertical members. For the rear seat, a seat bar horizontally connects between a pair of rear seat vertical members.

The four wheels each preferably have the same configuration in that they comprise a wheel tire and a wheel rim. The four wheels preferably have a total of four wheel tires and four wheel rims. The rear wheels and front wheels are preferably mounted on wheels supports. The front wheels can steer and not fixed to the frame. The pair of front wheels preferably can steer due to the wheel pivot connection that allows steering of the pair of front wheels. In contrast, pair of rear wheels are preferably fixed in orientation to the frame.

Children sitting in the wagon can put their feet on the foot rest that is formed as a grid like wire surface. The wire surface is preferably welded at its periphery to a foot rest frame. The foot rest frame is preferably supported by and connected to the central vertical member, to the rear seat vertical member and to the front seat vertical member. The foot rest frame is formed in a pair of sections, namely a front seat foot rest frame section and a rear seat foot rest frame section. The front seat foot rest frame section and the rear seat foot rest frame section are both formed as a rectangular loop. The foot rest frame is jointed for pivot connection at foot rest pivots.

The central lower joint is connected to the central vertical member, and a pair of diagonal members. The diagonal members are the front seat diagonal member and the rear seat diagonal member. There are a pair of pair of diagonal members for a total of four diagonal members, a pair on the right side of the wagon and a pair on the left side of the wagon. The first horizontal member rear portion is not necessarily mechanically connected to the rear seat vertical member, although such a configuration is possible. The first horizontal member front portion similarly is optionally connected to the front seat vertical member. The first horizontal folding member may have a bend called a first horizontal folding member bend that bends outward.

The rear seat vertical member and front seat vertical member are preferably disposed toward the inside of the wagon in an inside layer. Adjacent to the seat vertical members are the pair of first horizontal folding members and the pair of second horizontal folding members in a middle layer. Finally, supporting structure members, namely the central vertical member and the pair of diagonal members form an outside layer.

The seats can be made of fabric such as nylon and supported on the frame of the device such as by having sleeves fit over portions of the frame such as the seat bar and the arm rests. The seats can be removable so that they can be removed for cleaning as seen in figure. The seats preferably cover the joints of the wagon frame where curious fingers may roam.

The following call out list of elements is used consistently throughout in the figures.

22 Wheel Pivot Connection
25 Wheel Rim
26 Wheel Assembly
28 Wheel Tire
30 Folding Frame
31 Vertical Support
32 Upper Horizontal Support
33 Lower Outside Horizontal Support
37 Telescopic Bushing
38 Telescopic Extension
39 Telescopic Bulb
41 Bag Frame
42 Supplemental Link
43 First Diagonal Folding Member
44 Second Diagonal Folding Member
45 Third Diagonal Folding Member
46 Fourth Diagonal Folding Member
61 Lower Pivot Joint
62 Leaning Bar
63 Supplemental Link Outside Pivot Joint
65 Supplemental Link Inside Pivot Joint
66 Lower Major Pivot
67 Upper Major Pivot
68 Intermediate Major Pivot
69 Second Supplemental Link Inside Pivot Joint
72 Rear Inside Flatbed Support
73 Front Inside Flatbed Support
74 Central Flatbed Support Joint
75 Outside Flatbed Support Joint
77 Lengthwise Flatbed Support
78 Widthwise Flatbed Support
79 Flatbed Support Retainer Bar
82 Fabric Canopy
84 Fabric Bag
86 Fabric Upper Major Pivot Retainer Sleeve
88 Fabric Bed
91 Handle Grip
92 First Handle Joint
93 Second Handle Joint
94 Handle Yoke
95 Handle Stem
99 Handle Clip
110 Handle Assembly
112 Angle Connector
113 First Armrest Cushion
116 Second Horizontal Folding Member
117 Central Upper Joint Double Joint Angle Connector
118 First Horizontal Folding Member
119 Slide Joint
120 Seat Bar
123 Front Upper Horizontal Support
125 Wheel Rim
126 Second Armrest Cushion
128 Wheel Tire 129 Wheel Support
131 Rear Vertical Support
132 Rear Upper Horizontal Support
136 Front Vertical Support
137 Front Lower Horizontal Support
141 Front Seat Vertical Member
142 Front Seat Diagonal Member
143 Foot Rest Pivot
144 Central Lower Joint
145 Central Vertical Member
146 First Horizontal Folding Member Rear Portion
147 Rear Seat Diagonal Members
149 Rear Seat Vertical Members
148 First Horizontal Folding Member Bend
151 Frame Clip Body
152 Frame Clip Slot
161 Lower Pivot Joint
163 Middle Pivot Joint
171 Wheel Pivot Connection
181 Foot Rest
182 Foot Rest Frame
185 Central Middle Joint
186 Holding Bag
187 Canopy
188 Seat
189 Accessory Bag
195 Handle Clip

DETAILED DESCRIPTION OF THE PREFERRED EMBODIMENT

Figure 1:
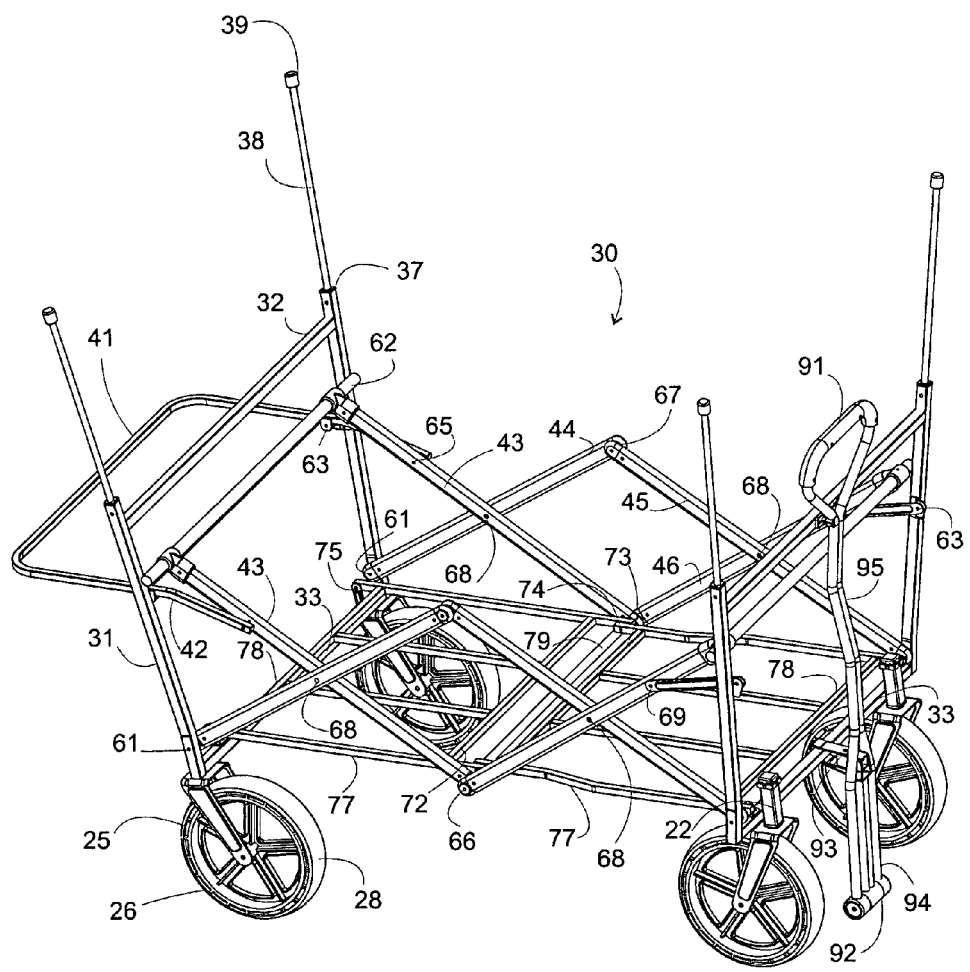
FIG. 1 is a perspective view of the present invention in open configuration.

The first embodiment of the present invention is a folding wagon with a folding frame 30 and fabric components mounted to the folding frame by generally well known techniques in the art such as making a sleeve, use of grommets, or providing hook and loop connection straps. The folding wagon generally has an open position for general use, and a stowed position where the wagon is folded. When the wagon is opened as seen in FIG. 1, the wheels are spaced apart from each other and the front wheels are spaced apart from the rear wheels. In closed position, the front wheels and the rear wheels have an almost coaxial configuration. The front wheels fit between the rear wheels when the wagon is folded. The folded configuration also drops down the bag holder.

Figure 3:
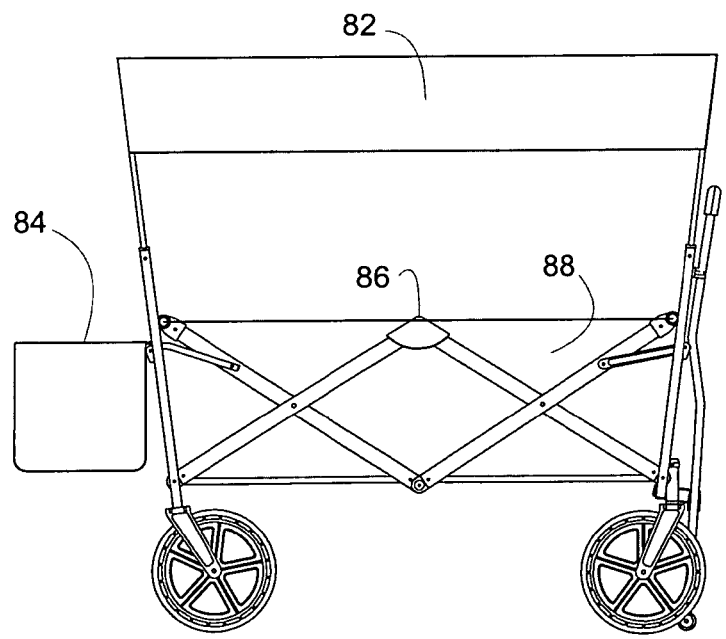
FIG. 3 is a side view of the present invention with all fabric members attached.
Figure 5:
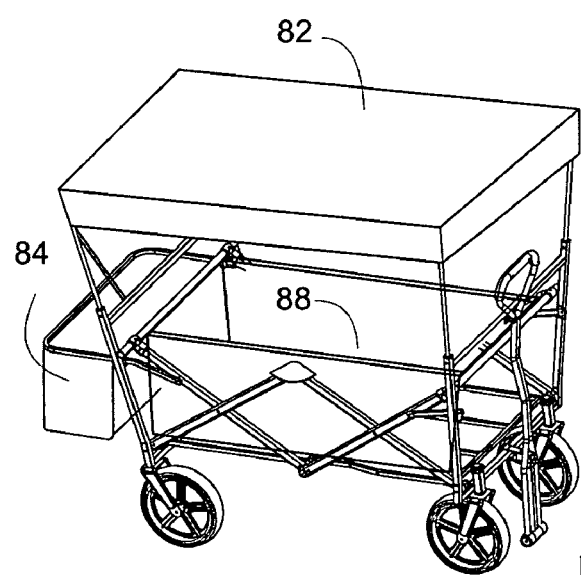
FIG. 5 is a perspective view of the present invention with all fabric members attached.

The present invention further has an extended position where the telescopic extensions 38 are extended away from the vertical supports 31. The vertical supports 31 are hollow and in retracted position, the telescopic extensions 38 are hidden within the vertical supports 31. The vertical supports 31 are preferably made of metal tubing having a square or rectangular cross-section. The vertical supports 31 have a telescopic bushing 37, which is an insert, preferably made of plastic, which generally permits movement, while restricting vertical telescopic movement when the vertical supports 31 are biased toward one another when the fabric canopy 82 is installed as seen in FIGS. 3, 5. The cloth fabric portions including the fabric canopy 82, the fabric bag 84, and the fabric bed 88 can all be removed for washing. The fabric bed 88 optionally includes bottom panels for supporting articles. The bottom panels can be made of hard plastic plates with foam soft covering over them. The bottom panels can be sewn into the fabric bed, or into pockets in the fabric bed. The bottom panels fold upwards in the middle of the bed for providing easy collapse of the wagon. A fabric strap extending through the fabric bed 88 can be provided for handgrip for closing the wagon. The fabric members may receive a sleeve or hook and loop connection to provide attachment to the folding frame 30.

The folding frame 30 has vertical supports 31 at each of its four corners. The vertical supports are attached to wheel assemblies 26. The wheel assemblies preferably have a wheel pivot connection 22 on the front pair of wheels, and a rigid welded connection on the rear pair of wheels. The wheel assembly 26 includes a wheel rim 25 for receiving a wheel tire 28.

Besides supporting the wheels, the vertical supports 31 are rigidly connected to upper horizontal supports 32 at the four corners of the wagon. Opposing the upper horizontal supports are lower outside horizontal supports to form a trapezoidal frame. The upper horizontal supports 32 are preferably slightly longer than the lower outside horizontal supports 33 such that the vertical supports 31 are not perfectly vertical and extend away or otherwise tilt away from the middle of the wagon.

At the rear of the wagon is a bag frame 41 formed as a bent tube, which is bent preferably four times, with two major bends in the rear for defining a rectangular bag frame rim, and with two minor bends downward to meet at supplemental link inside pivot joints 65. The bag frame 41 is connected to the vertical supports 31 at a supplemental link outside pivot joint 63. The bag frame 41 has a front portion forming a pair of supplemental links 42. The supplemental links 42 are, in the rear of the wagon, in pivot connection between the first diagonal folding member 43 and the vertical support 31. On the other hand, in the front of the wagon, the supplemental links 42 are in pivot connection between the fourth diagonal folding member 46 and the vertical support 31. The supplemental links 42 in the front of the wagon connect to the fourth diagonal folding member 46 at a second supplemental link inside pivot joint 69. The supplemental links in the rear portion of the wagon connect to the first diagonal folding member by supplemental link inside pivot joints 65. The supplemental links connect to the folding members at a location between a pair of intermediate major pivots 68 and a leaning bar 62.

The folding frame 30 is assembled by a pair of diagonal folding member apparatus forming the left and right side of the wagon walls. The diagonal folding member apparatus is comprised of a first diagonal folding member 43 pivotally connected to a second diagonal folding member 44 at approximately a midpoint of the first diagonal folding member 43 and at approximately a midpoint of the second diagonal folding member 44 which is at the intermediate major pivot 68. The third diagonal folding member 45 and the fourth diagonal folding member 46 are also pivot connected at or near their midpoints at the intermediate major pivot 68. The first diagonal folding member 43 and second diagonal folding member 44 are connected to the third diagonal folding member 45 and the fourth diagonal folding member 46 at an upper major pivot and a lower major pivot. The lower major pivot 66 is a pivot connection between the first diagonal folding member 43 and the fourth diagonal folding member 46. The second diagonal folding member 44 is pivot connected to the third diagonal folding member 45 at an upper major pivot 67. The folding frame 30 also has connection to the vertical support 31 at the lower pivot joint 61 where the second diagonal folding member 44 is pivot connected to the vertical support 31. The third diagonal folding member 45 is pivot connected to the vertical support 31 at a lower pivot joint 61.

The handle assembly has a handle grip 91 connected to a handle stem 95 which terminates on a handle yoke 94 providing a folding connection at a first handle joint 92 with a lower stem which is connected to the second handle joint 93. The second handle joint 93 provides left to right swiveling and up-and-down swiveling. The first handle joint 92 provides up-and-down swiveling. Optionally, a handle clip mounted on the front upper horizontal support 32 provides handle storage when the wagon is in stowed position.

The flatbed assembly comprises a plurality of lengthwise flatbed supports 77 which as shown in FIG. 1 and in the preferred embodiment number eight in total with four in the front and four in the rear. The plurality of flatbed supports are preferably pivotally mounted to the vertical supports, equivalently either at the actual post of the vertical support, or indirectly mounted to the vertical support at the lower horizontal support. The lengthwise flatbed supports 77 in the rear half are connected to a rear inside flat flatbed support 72 and a widthwise flatbed support 78 at the rear of the wagon. The rear inside flatbed support 72 spans between the outermost pair of lengthwise flat bed supports 77. The innermost pair of lengthwise flatbed supports 77 span between the widthwise flatbed support 78 and the rear inside flatbed support 72. The structure of the front half of the flatbed support assembly is the same. The front inside flatbed support 73 spans between the outermost pair of lengthwise flatbed supports 77 in the front half, and analogously the innermost pair of lengthwise flatbed supports 77 span between the front inside flatbed support 73 and the widthwise flatbed support 78.

In the very middle of the flatbed assembly, the front lengthwise flatbed supports 77 and the rear lengthwise flatbed supports 77 hinge at the central flatbed support joint 74. Between the lower major pivot 66, a flatbed support retainer bar 79 passes and connects between the left and right pair of diagonal folding member walls. The flatbed support retainer bar 79 supports the central flatbed support joint 74. The front outer pair of lengthwise flatbed supports 77 and of the rear outer pair of lengthwise flatbed supports 77 both have an end closest to the major pivot 66 and the end preferably extends over the flatbed support retainer bar 79 so that the flatbed support retainer bar 79 can support the flatbed assembly.

In open position, the wagon has numerous pivot joints, and three leaning connections. The leaning connections are comprised of: the front and rear leaning bar 62 resting against the vertical support 31; and the lengthwise flatbed support 77 resting on the flatbed support retainer bar 79. The lengthwise flatbed supports 77 have a central flatbed support joint 74 that is preferably not coaxial and preferably slightly above the lower major pivot 66. The lower major pivot 66 preferably passes a bolt through its center to retain the flatbed support retainer bar 79 which is coaxial to the bolt and coaxial to the lower major pivot 66. For transforming the apparatus into stowed position, the strap handle is preferably connected to the middle of the flatbed support retainer bar 79, passing through an opening in the fabric bed 88 so that a user can pull up the entire apparatus to collapse it for storage.

Figure 2:
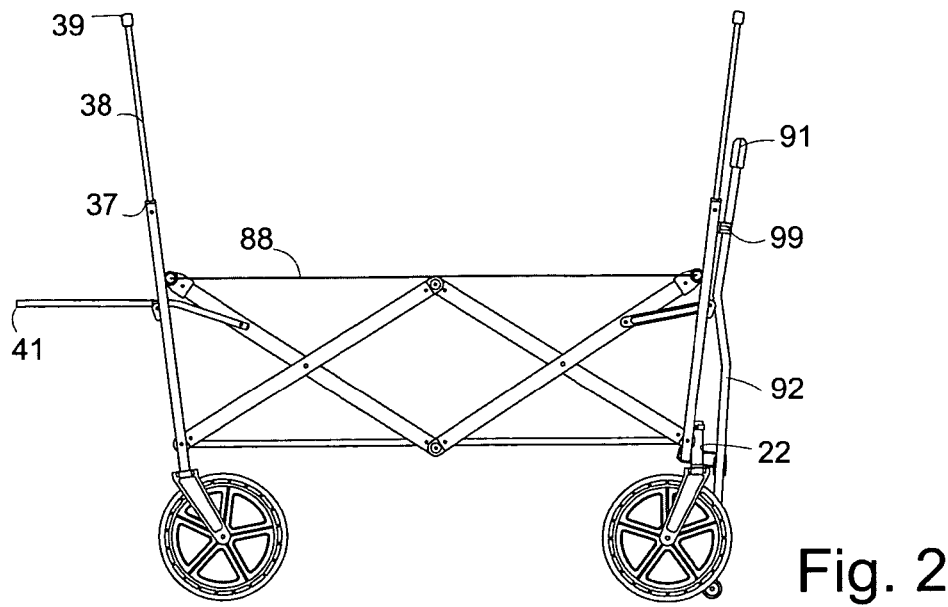
FIG. 2 is a side view of the present invention.

Before storing away the wagon in collapsed form, the user removes the fabric canopy 82. The fabric canopy 82 has a trapezoidal side profile as seen in FIG. 3. The trapezoidal side profile provides a smaller opening and a larger inside area similar to a fitted sheet on a mattress. Thus, the top portion of the fabric canopy 82 has a greater length than the bottom portion of the fabric canopy 82. After a user removes the fabric canopy 82, the user can optionally remove the fabric bag 84 from the rear of the wagon. The fabric bag 84, FIG. 3 is preferably connected to the wagon as a sleeve of fabric wrapped around the bag frame 41, FIG. 2. A user may also clip the handle stem 95 to the handle clip 99. The trapezoidal side profile fabric canopy 82 preferably matches in color with the fabric bed 88. The fabric bed 88 has rigid bottom panels.

To take down the trapezoidal side profile fabric canopy 82, the user bends the telescopic bulbs 39 toward the middle of the wagon providing slack to remove one telescopic bulb 39 from a corner of the trapezoidal side profile fabric canopy 82. Once a quarter is removed, the rest of the fabric canopy 82 comes off easily.

Figure 4:
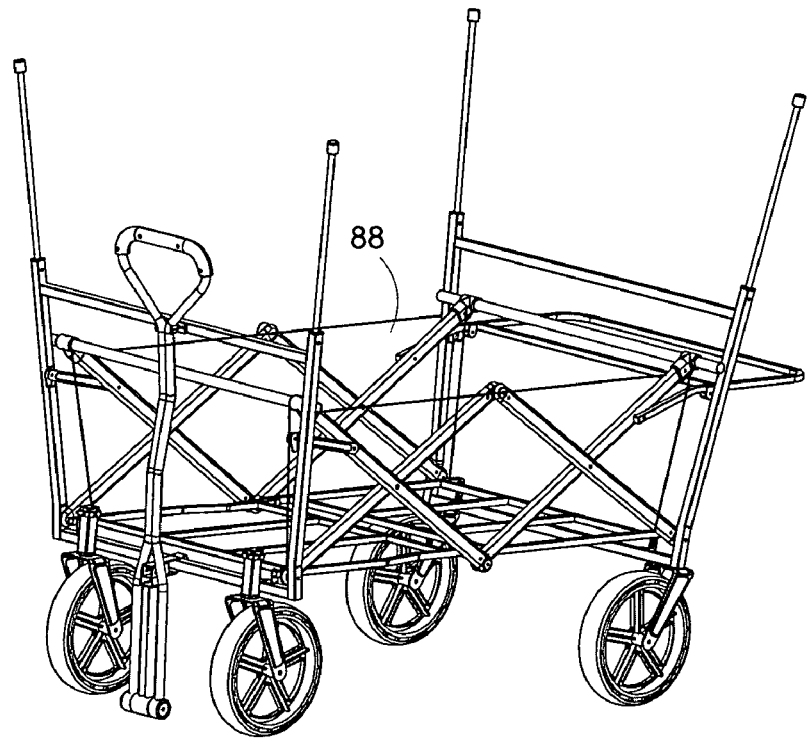
FIG. 4 is a perspective view of the present invention showing the location of the bed fabric member.

The fabric bed 88 further includes a fabric upper major pivot retainer sleeve 86 as seen in FIG. 3. The fabric upper major pivot retainer sleeve 86 preferably has an arc shaped lower portion with an angular top portion matching the angle between the second diagonal folding member 44 and the third diagonal folding member 45. The fabric bed 88 can also be partially or completely transparent for allowing viewing of articles within. The fabric bed 88 can also be shown in transparent fabric as seen in FIG. 4. FIG. 5 provides a partially transparent view of the fabric bed 88. The fabric bed 88 may also receive embroidery or screen printing for decorative effect.

The lower the joint 61 and the outside flatbed support joint 75 are preferably coaxial although they do not necessarily have to be. In the best mode, a long bolt passes through both of them to provide a single bolt axis. Each of the pivot connections can also be bolt connected or grommet connected, or pin connected, or rivet connected. A wide variety of pivot connections are available with rivet connections favored on light connection areas.

Figure 6:
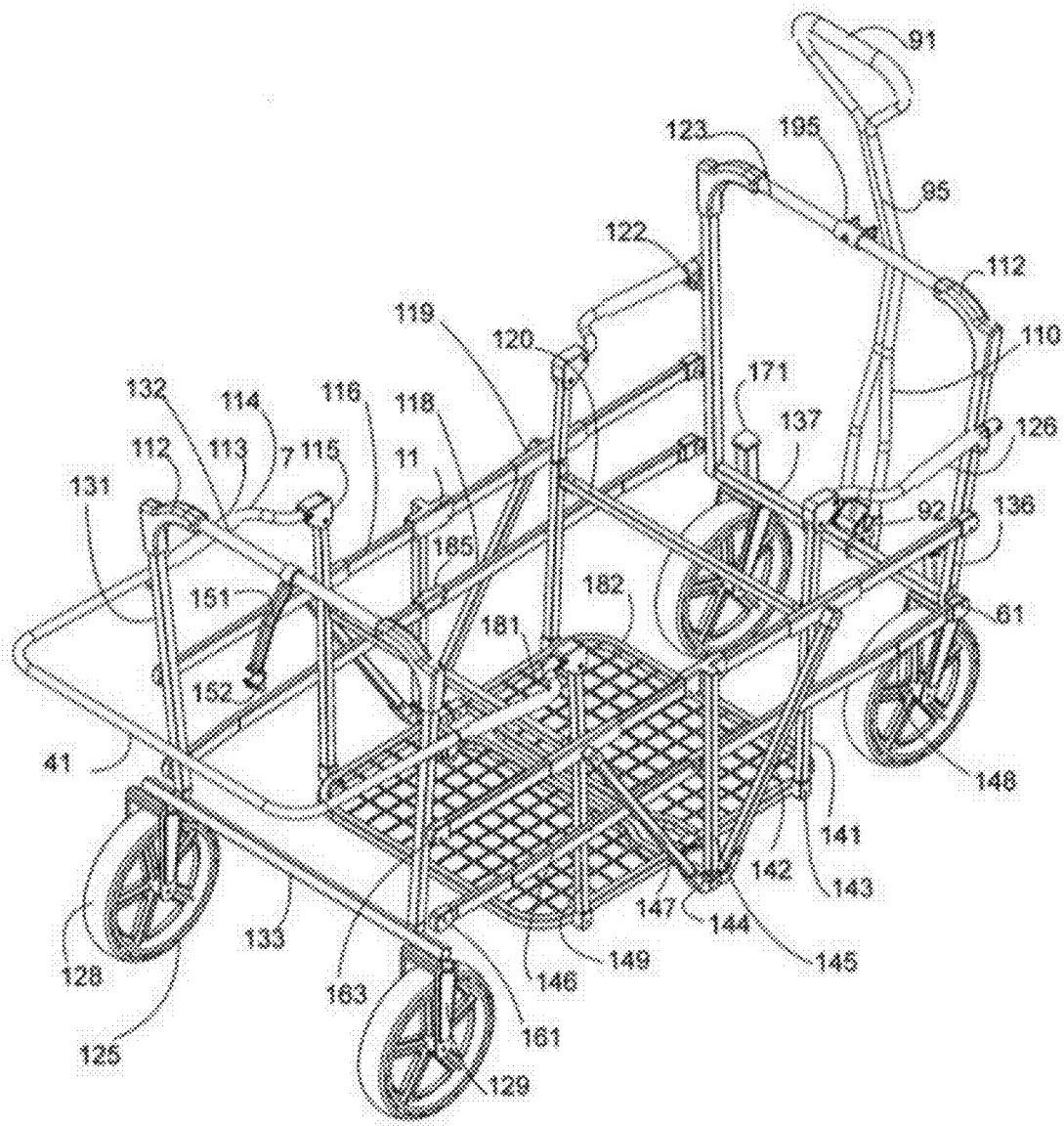
FIG. 6 is a perspective partial exploded view of the wagon frame with seats removed of the second embodiment.
Figure 7:
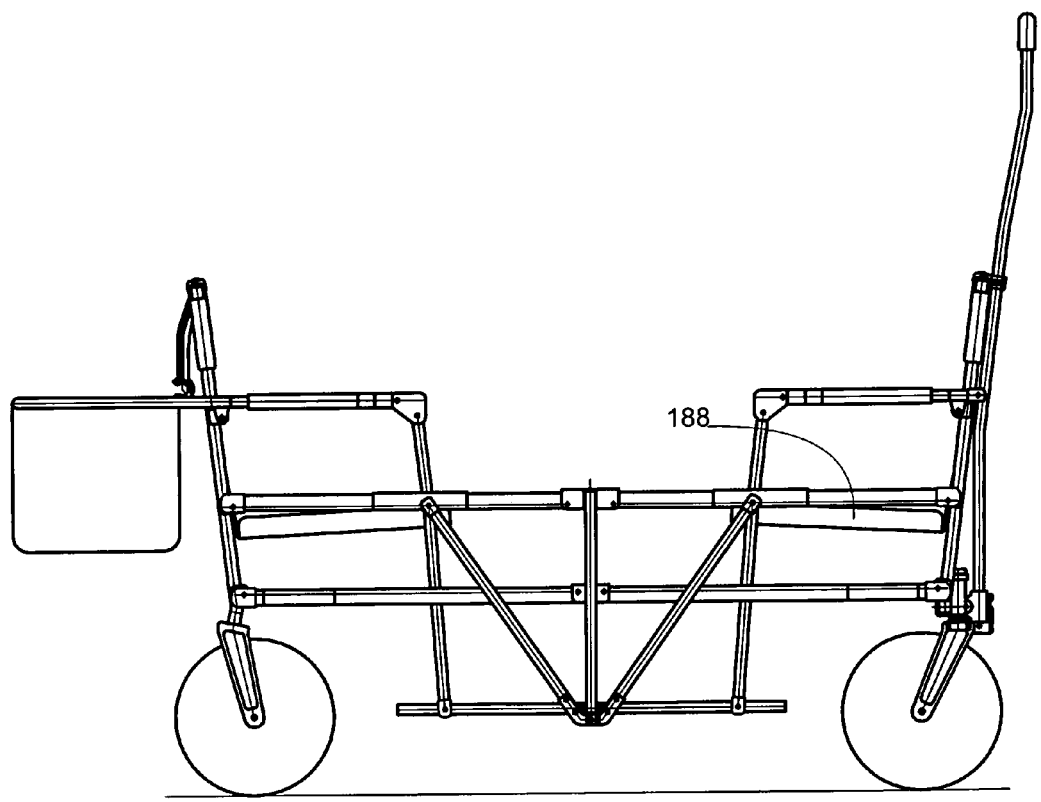
FIG. 7 is a side view of the wagon frame with seats of the second embodiment.
Figure 8:
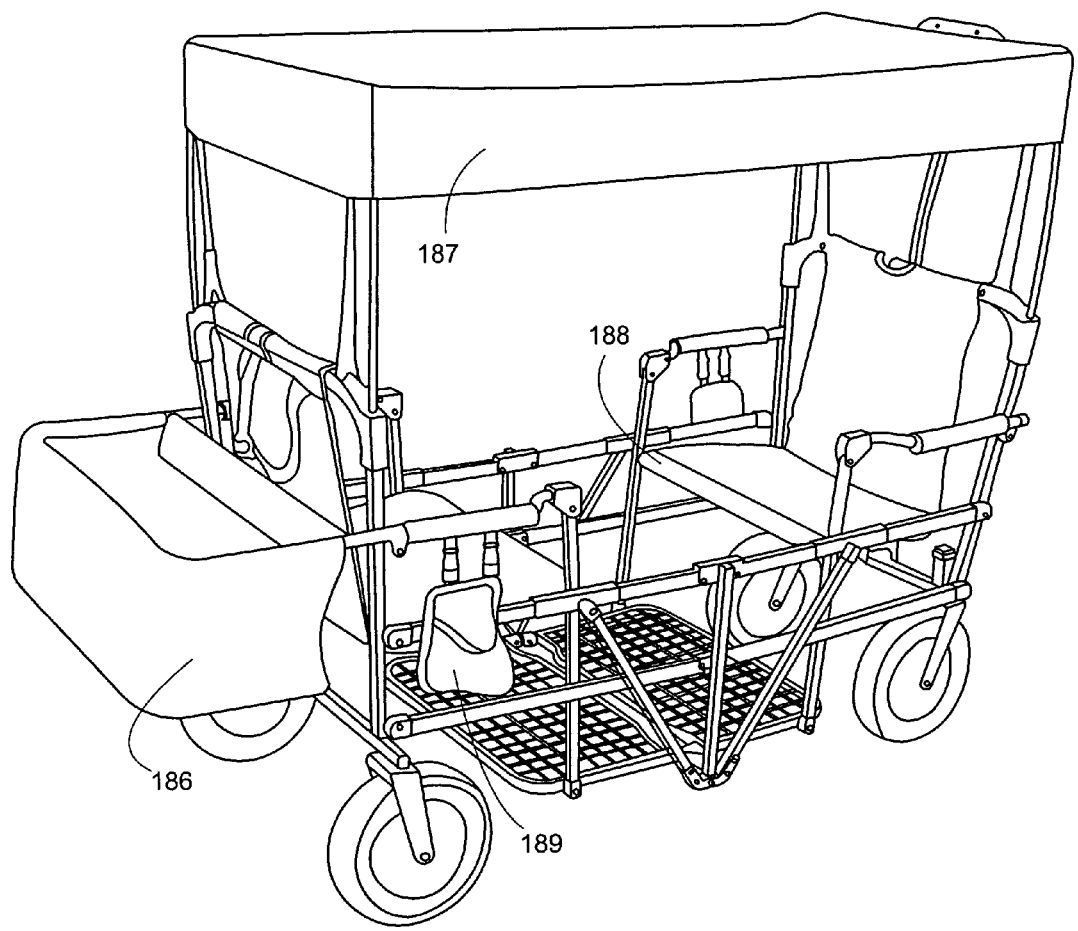
FIG. 8 is a perspective partial exploded view of the complete wagon including all the soft parts of the second embodiment.

The second embodiment of the present invention includes a folding wagon with a pair of bench seats, namely a front seat and a rear seat, as seen in FIGS. 6-8. The folding wagon with seats can be constructed with the same general outside frame as the folding wagon without seats. The folding wagon with seats has many common characteristics shared with the other embodiment, such as a handle assembly 110, handle yoke 94, handle stem 95 and handle grip 91. There is preferably one handle assembly 110, one handle yoke 94, a single handle stem 95, and a single handle grip 91 The second handle joint 93 of the first embodiment is preferably not included in the second embodiment such that the handle directly connects to the frame of the wagon via the first handle joint 92. Optionally, the handle clip 195 can be screw mounted to the front upper horizontal support 123. Preferably, there is a single handle clip 195.

The folding wagon with seats has a folded configuration and a deployed configuration. When the folding wagon with seats is folded, a frame clip retains the rear upper horizontal support 132 to the front upper horizontal support 123. Preferably, there is a single rear upper horizontal support 132, although there could be more. The frame clip also includes a frame clip body 151 that is preferably elongated and terminates in a frame clip slot 152. The frame clip slot is engaged with the front upper horizontal support 123 when the folding wagon is in a folded configuration. A protrusion such as a tab on the back of the frame clip slot 152 provides a finger grip for biasing the frame clip slot 152 off of the front upper horizontal support 123 when a user desires to transform the folding wagon from deployed configuration to the folded configuration. The frame clip is mounted in an offset position so that it does not interact with the handle clip 195. The length of the frame clip is approximately the width of the apparatus in folded configuration. Preferably, there is a single frame clip, although there could be a pair or more.

The frame of the wagon is constructed in a folding manner including an angle connector 112 that connects a preferably hollow square cross-section vertical stanchion to a horizontal round cross-section tube. Preferably, there are four angle connectors 112. Each angle connector 112 connects the front upper horizontal support 123 to the front vertical support 136.

Preferably, there is a single front upper horizontal support, although there could be more and preferably also a pair of front vertical supports 136. The front vertical support 136 is preferably welded to the front lower horizontal support 137. In a similar manner, the angle connector 112 is used for connecting the rear upper horizontal support 132 to the rear vertical support 131. Preferably, there is a pair of rear vertical support 131 so that there are a total of four vertical supports at each of the four corners of the wagon above each of the four wheels of the wagon. Additionally, the pair of rear vertical supports 131 are preferably connected to the rear lower horizontal support 133 by welding. Preferably, there is a single rear lower horizontal support 133. The angle connector may have a pair of screw openings that are threaded or unthreaded for allowing a screw to pass through the opening of the angle connector and engage and retain the support member inserted into a socket of the angle connector. The angle connector 112 can also be made as a bending of a member such that the integral one piece construction can be a substitute.

A bag frame 41 is similarly pivotally attached to the frame of the wagon at upper pivot joints 122, and continuations from the bag frame extend to joint angle connectors 115. The continuations form arm rest members 114 that have a first arm rest cushion 113 in the rear seat and a second arm rest cushion 126 in the front seat. In the rear seat, the joint angle connector 115 connects the rear seat vertical member 149 to the arm rest member 114 in a pivotal fashion. For the front seat, the joint angle connector 115 connects the armrest member to the front seat vertical member at 141 in a similar fashion as in the rear seat. Preferably, there are a total of four armrests, one in the front right of the wagon, one in the front left of the wagon, one in the rear left of the wagon and one in the rear right of the wagon such that there are a pair of armrests in the front seat and a pair of armrests in rear seat, and also such that there are a pair of armrests on the right side of the wagon and a pair of armrests on the left side of the wagon.

A number of horizontal folding members form a pair of sidewalls for retaining children within the folding wagon. The wagon frame preferably has a pair of second horizontal folding members and a pair of first horizontal folding members. The wagon frame preferably has a left second horizontal folding member a right second horizontal folding member. Each horizontal folding member can be formed in a pair of sections such that there are a total of eight sections, namely: a right front seat first horizontal member folding section, a left front seat first horizontal member folding section, a right front seat second horizontal member folding section, a left front seat second horizontal member folding section; and a right rear seat first horizontal member folding section, a left rear seat first horizontal member folding section, a right rear seat second horizontal member folding section, and a left rear seat second horizontal member folding section.

The second horizontal folding member 116 and the first horizontal folding member 118 are mechanically connected via intermediate linkages. The wagon frame preferably has a right first horizontal folding member and a left first horizontal folding member. The first horizontal folding member 118 is below and parallel to the second horizontal folding member 116, which is in turn below the armrest member 114. The second horizontal folding member is pivotally attached at its pair of ends to the middle pivot joint 163. The first horizontal folding member is pivotally attached at its pair of ends to the lower pivot joint 161. The lower pivot joint 161 corresponds to the lower pivot joint 61 of the first embodiment.

As seen in FIG. 6, the lower pivot joint 161 is attached by a pin or round joint member on a cap fitted to the first horizontal folding member. The partial exploded view of FIG. 6 shows that the cap is placed flush against the flat portion of the rear vertical support 131. A bracket welded to the vertical support can connect between the cap and the vertical support.

A central upper joint 117 preferably forms a double joint angle connector which bisects at a middle point of the second horizontal folding member. The central middle joint 185 similarly bisects the middle part of the first horizontal folding member. The first horizontal folding member is therefore preferably formed as a pair of hollow steel members having a front and rear section. The central middle joint 185 connects the first horizontal folding member to the central vertical member. The central upper joint 117 connects the second horizontal folding member to the central vertical member and an upper end. The lower portion of the central vertical member 145 is connected to a central lower joint 144.

A slide joint 119 fits as a sleeve over the second horizontal folding member to allow sliding relative to the second horizontal folding member 116. A total of four slide joints fit over a total of four sections of the second horizontal folding member 116.

In the front seat, a seat bar 120 is horizontally connected between a pair of front seat vertical members 121. For the rear seat, a seat bar horizontally connects between a pair of rear seat vertical members.

The four wheels each preferably have the same configuration in that they comprise a wheel tire 120 and a wheel rim 125. The four wheels preferably have a total of four wheel tires and four wheel rims. The rear wheels and front wheels are preferably mounted on wheel supports. The front wheels are steerable and not fixed to the frame. The pair of front wheels preferably are steerable due to the wheel pivot connection 171 that allows steering of the pair of front wheels. The pair of rear wheels is preferably fixed in orientation to the frame.

Children sitting in the wagon can put their feet on the foot rest 181 that is formed as a grid like wire surface. The wire surface is preferably welded at its periphery to a foot rest frame 182. The foot rest frame is preferably supported by and connected to the central vertical member 145, to the rear seat vertical member 149 and to the front seat vertical member 141. The foot rest frame 182 is formed in a pair of sections, namely a front seat foot rest frame section and a rear seat foot rest frame section. The front seat foot rest frame section and the rear seat foot rest frame section are both formed as a rectangular loop. The foot rest frame 182 is jointed for pivot connection at foot rest pivots 143.

The central lower joint 144 is connected to the central vertical member 145, and a pair of diagonal members. The diagonal members are the front seat diagonal member 142 and the rear seat diagonal member 147. There are a pair of pair of diagonal members for a total of four diagonal members, a pair on the right side of the wagon and a pair on the left side of the wagon. The first horizontal member rear portion 146 is not necessarily mechanically connected to the rear seat vertical member 149, although it can be. The first horizontal member front portion similarly is optionally connected to the front seat vertical member. The first horizontal folding member may have a bend called a first horizontal folding member bend 148 that bends outward.

The rear seat vertical member 149 and front seat vertical member 141 are preferably disposed toward the inside of the wagon in an inside layer. Adjacent to the seat vertical members are the pair of first horizontal folding members and the pair of second horizontal folding members in a middle layer. Finally, supporting structure members, namely the central vertical member 145 and the pair of diagonal members form an outside layer.

The soft parts of the wagon with seats are shown in FIG. 8 and the soft parts would include the fabric portions such as the canopy, seats, bags and back bag. The pair of seats 188 can be made of fabric such as nylon and supported on the frame of the device such as by having sleeves fit over portions of the frame such as the seat bar 120 and the arm rests or more preferably, as shown in FIG. 8, the front upper horizontal support 123 and the rear upper horizontal support 132. The seats can be removable so that they can be removed for cleaning as seen in FIG. 6. The canopy 187 can be constructed in the same way as the other embodiment. A back bag 186 is similar to the fabric bag 84 of the first embodiment. A holding bag 189 can be used for holding articles such as sippy cups. Preferably, there is a pair of bags of holding for symmetrical effect. The pair of seats 188 can be partially hard having a plank portion or a padded portion on top of a plank portion, as seen in FIG. 7. The seats even if having partially hard parts would still be preferably suspended from the wagon frame.

The invention claimed is:

1. A folding wagon comprising:
    a. a folding frame having a stowed position and an open position; wherein the folding frame comprises a pair of front vertical supports, a pair of rear vertical supports, a lower front horizontal support connecting between the pair of front vertical supports, a lower rear horizontal support connecting between the pair of rear vertical supports, an upper front horizontal support connecting between the pair of front vertical supports, and an upper rear horizontal support connecting between the pair of rear vertical supports; wherein the folding frame further comprises supplemental links that form a frame for seats including a front seat bar extending between a pair of front seat vertical members and including a rear seat bar extending between a pair of rear seat vertical members, and further comprising sidewall members, wherein the sidewall members further comprise a pair of horizontal supports pivotally connected to the front vertical supports and the rear vertical supports, wherein the pair of horizontal supports comprises a right horizontal support and a left horizontal support;
    b. a pair of seats, wherein the pair of seats comprises a front seat mounted to the front seat bar and a rear seat mounted to a rear seat bar;
    c. a foot rest pivotally mounted to the pair of front seat vertical members and pivotally mounted to the pair of rear seat vertical members, wherein at least a portion of the foot rest is positioned between the pair of front seat vertical members and the pair of rear seat vertical members, wherein the front seat vertical members and the rear seat vertical members are positioned between the front vertical members and the rear vertical members; and
    d. wheels attached to the folding frame.

2. The folding wagon of claim 1, further comprising four telescopic bushing mounted on the pair of front vertical supports and on the pair of rear vertical supports, wherein the pair of front vertical supports and the pair of rear vertical supports are substantially hollow.

3. The folding wagon of claim 1, further comprising a pair of front armrests and a pair of rear armrests, wherein the pair of front armrests are pivotally connected to the pair of front vertical supports, and wherein the pair of rear armrests art pivotally connected to the pair of rear vertical supports.

4. The folding wagon of claim 1, further comprising a pair of front armrests and a pair of rear armrests, wherein the pair of front armrests are pivotally connected to the pair of front seat vertical members, and wherein the pair of rear armrests are pivotally connected to the pair of rear seat vertical members.

5. The folding wagon of claim 1, wherein the pair of horizontal supports of the sidewall members include a pair of first horizontal folding members and a pair of second horizontal folding members, wherein the pair of first horizontal folding members are connected to a pair of central vertical members, and wherein the pair of second horizontal folding members is connected to the pair of central vertical member, wherein the sidewall members include the pair of central vertical members, the pair of first horizontal folding members, and the pair of second horizontal folding members.

6. The folding wagon of claim 1, wherein the sidewall members include a pair of front seat diagonal members and a pair of rear seat diagonal members, wherein the pair of front seat diagonal members are pivotally connected to a central lower joint, wherein the pair of rear seat diagonal members are pivotally connected to the central lower joint, wherein the pair of central vertical members is connected to the central lower joint, wherein the pair of front seat diagonal members are connected to the pair of horizontal supports, wherein the pair of rear seat diagonal members are connected to the pair of horizontal supports.

7. A folding wagon comprising:
    a. a folding frame having a stowed position and an open position; wherein the folding frame comprises a pair of front vertical supports, a pair of rear vertical supports, a lower front horizontal support connecting between the pair of front vertical supports, a lower rear horizontal support connecting between the pair of rear vertical supports, an upper front horizontal support connecting between the pair of front vertical supports, and an upper rear horizontal support connecting between the pair of rear vertical supports; wherein the folding frame further comprises supplemental links that forms a frame for a seat bar extending between a pair of seat vertical members and further comprising sidewall members, wherein the sidewall members further comprise a pair of horizontal supports pivotally connected to the front vertical supports and the rear vertical supports, wherein the pair of horizontal supports comprises a right horizontal support and a left horizontal support;
    b. a seat, wherein the seat is at least partially made of fabric material and mounted between the seat bar and an upper horizontal support;
    c. a foot rest pivotally mounted to the pair of front seat vertical members and pivotally mounted to the pair of rear seat vertical members, wherein at least a portion of the foot rest is positioned between the pair of front seat vertical members and the pair of rear seat vertical members, wherein the front seat vertical members and the rear seat vertical members are positioned between the front vertical members and the rear vertical members; and
    d. wheels attached to the folding frame.

8. The folding wagon of claim 7, further comprising four telescopic bushing mounted on the pair of front vertical supports and on the pair of rear vertical supports, wherein the pair of front vertical supports and the pair of rear vertical supports are substantially hollow.

9. The folding wagon of claim 7, further comprising a pair of armrests, wherein the pair of armrests are pivotally either connected to the pair of front vertical supports or connected to the pair of rear vertical supports.

10. The folding wagon of claim 7, further comprising a pair of armrests, wherein the pair of armrests is pivotally connected to the pair of seat vertical members.

11. The folding wagon of claim 7, wherein the pair of horizontal supports of the sidewall members include a pair of first horizontal folding members and a pair of second horizontal folding members, wherein the pair of first horizontal folding members are connected to a pair of central vertical members, and wherein the pair of second horizontal folding members is connected to the pair of central vertical member, wherein the sidewall members include the pair of central vertical members, the pair of first horizontal folding members, and the pair of second horizontal folding members.

12. The folding wagon of claim 7, wherein the sidewall members include a pair of seat diagonal members, wherein the pair of seat diagonal members are pivotally connected to a central lower joint, wherein a pair of central vertical members is connected to the central lower joint, wherein the pair of seat diagonal members are connected to the pair of horizontal supports, wherein the pair of seat diagonal members are connected to the pair of horizontal supports.

13. A folding wagon comprising:
a. a folding frame having a stowed position and an open position; wherein the folding frame comprises a pair of front vertical supports, a pair of rear vertical supports, a lower front horizontal support connecting between the pair of front vertical supports, a lower rear horizontal support connecting between the pair of rear vertical supports, an upper front horizontal support connecting between the pair of front vertical supports, and an upper rear horizontal support connecting between the pair of rear vertical supports; wherein the folding frame further comprises supplemental links that form a frame for seats including a front seat bar extending between a pair of front seat vertical members and including a rear seat bar extending between a pair of rear seat vertical members, and further comprising sidewall members, wherein the sidewall members further comprise a pair of horizontal supports pivotally connected to the front vertical supports and the rear vertical supports, wherein the pair of horizontal supports comprises a right horizontal support and a left horizontal support, wherein the pair of horizontal supports of the sidewall members, comprise a pair of horizontal folding members pivotally connected to a pair of central vertical members, wherein the right horizontal support is formed as a pair of segments, namely a front right horizontal support segment and a rear right horizontal support segment, and wherein the left horizontal support is formed as a pair of segments, namely a front left horizontal support segment and a rear left horizontal support segment, wherein the pair of horizontal supports are pivotally connected at a pair of double joint angle connectors;
b. a pair of seats, wherein the pair of seats comprises a front seat mounted to the front seat bar and a rear seat mounted to a rear seat bar;
c. a foot rest pivotally mounted to the pair of front seat vertical members and pivotally mounted to the pair of rear seat vertical members, wherein at least a portion of the foot rest is positioned between the pair of front seat vertical members and the pair of rear seat vertical members, wherein the front seat vertical members and the rear seat vertical members are positioned between the front vertical members and the rear vertical members; and
d. wheels attached to the folding frame.

14. The folding wagon of claim 13, further comprising four telescopic bushing mounted on the pair of front vertical supports and on the pair of rear vertical supports, wherein the pair of front vertical supports and the pair of rear vertical supports are substantially hollow.

15. The folding wagon of claim 13, further comprising a pair of front armrests and a pair of rear armrests, wherein the pair of front armrests are pivotally connected to the pair of front vertical supports, and wherein the pair of rear armrests art pivotally connected to the pair of rear vertical supports.

16. The folding wagon of claim 13, further comprising a pair of front armrests and a pair of rear armrests, wherein the pair of front armrests are pivotally connected to the pair of front seat vertical members, and wherein the pair of rear armrests are pivotally connected to the pair of rear seat vertical members.

17. The folding wagon of claim 13, wherein the sidewall members include a pair of front seat diagonal members and a pair of rear seat diagonal members, wherein the pair of front seat diagonal members are pivotally connected to a central lower joint, wherein the pair of rear seat diagonal members are pivotally connected to the central lower joint, wherein the pair of central vertical members is connected to the central lower joint, wherein the pair of front seat diagonal members are connected to the pair of horizontal supports, wherein the pair of rear seat diagonal members are connected to the pair of horizontal supports.

18. The folding wagon of claim 17, further comprising a pair of front armrests and a pair of rear armrests, wherein the pair of front armrests are pivotally connected to the pair of front seat vertical members, and wherein the pair of rear armrests are pivotally connected to the pair of rear seat vertical members.

* * * * *